United States Patent [19]

Buchan et al.

[11] 3,922,610

[45] Nov. 25, 1975

[54] PULSE ANTI COINCIDENCE METHODS AND CIRCUITS

[75] Inventors: William A. Buchan, Newport Beach; Harold E. Arns, Chino, both of Calif.

[73] Assignee: BASF Aktiengesellschaft, Ludwigshafen (Rhine), Germany

[22] Filed: Jan. 28, 1974

[21] Appl. No.: 437,284

[52] U.S. Cl. ................ 328/109; 307/232; 328/134

[51] Int. Cl.² ..................... H03K 5/20; H03D 13/00

[58] Field of Search ........... 328/72, 73, 74, 75, 133, 328/134, 109, 110; 307/232

[56] References Cited

UNITED STATES PATENTS

| | | | |
|---|---|---|---|
| 3,112,450 | 11/1963 | Krause | 328/109 |
| 3,327,226 | 6/1967 | Nourney | 328/109 |
| 3,441,342 | 4/1969 | Ball et al. | 328/134 X |
| 3,444,470 | 5/1969 | Bolt et al. | 328/109 |
| 3,532,994 | 10/1970 | Ferrier | 328/134 X |
| 3,534,261 | 10/1970 | Haner et al. | 328/133 X |
| 3,593,161 | 7/1971 | Ritz | 328/109 |

*Primary Examiner*—Stanley D. Miller, Jr.

[57] ABSTRACT

Methods and circuits for preventing the coincidence of reference and feedback pulses in a servo system which utilizes a phase detector incorporating an up-down counter, wherein an anti-coincidence circuit assigns separate time zones in which reference and feedback output pulse can occur.

8 Claims, 4 Drawing Figures

PULSE ANTI COINCIDENCE METHODS AND CIRCUITS

BACKGROUND OF THE INVENTION

The methods and circuits disclosed herein are applicable to any system where it is necessary to insure that two pulses do not arrive in coincidence. More specifically, the invention may be applied to any type of constant or variable speed servo system which utilizes a feedback loop and a phase detector incorporating an up-down counter to compare a reference signal with a feedback signal. More particularly yet, the system is applicable in video signal recording.

Video tape recorders which have been on the market in the past have recorded in only one direction on one inch wide magnetic tape. These video recorders use a helical scan method which consists of recording the signal diagonally to the longitudinal direction of the tape. More recently developed video tape recording systems utilize ¼ inch wide magnetic tape and record the video signal longitudinally on the tape in multiple tracks of 20 or more across the ¼ inch width of the tape. See the copending application Ser. No. 388,929, filed by G. Rotter el at. on Aug. 16, 1973. These tape recording systems drive the video tape at speeds in the range of 120 inches per second, and they require that the tape be stopped at the end of each track and driven in the opposite direction while simultaneously changing from one track to another. It is necessary that these video recorders be operated in a highly accurate manner in order to reproduce the recorded video signal without objectionable reduction in the video picture as seen on a video receiver during playback. It is also necessary that the turnaround at the end of each track of video tape be accomplished in an accurate and reproducible manner. In order to accomplish this, a feedback system is necessary.

The methods and circuits disclosed herein can be utilized with any feedback system which obtains feedback signal pulses having a frequency related to the device to be controlled, for example, from a tachometer directly connected to the capstan drive motor of a video recorder. This tachometer supplies the feedback signal pulses which are compared to reference signal pulses in a phase detector incorporating an up-down counter. In such a system, it is necessary that the reference and feedback signal pulses from the feedback system do not coincide at the input of the up-down counter. If this occurs servo accuracy will be destroyed. In a video recorder, playback accuracy will be destroyed and picture quality on the video receiver will contain objectionable distortion. The methods and embodiments disclosed herein prevent the coincidence of feedback and reference signals.

SUMMARY OF THE INVENTION

Two methods and embodiments of the anti-coincidence circuits are disclosed and described herein comprising anti-coincidence circuits having separate input points for reference signal pulses and feedback signal pulses and having separate output points for reference and feedback output pulses; and means for assigning, within said anti-coincidence circuit, separate time zones in which reference and feedback output pulses can occur. Both of these embodiments are useful in any type of servo system which requires accurate operation and reversal, and which utilizes a feedback system with a phase detector incorporating an up-down counter to compare reference and feedback signal pulses. Both embodiments described herein assign separate time zones in which reference and feedback output pulses can occur.

In the first system the separate time zones are defined by a two phase clock, the first phase of the clock being the time in which a reference pulse is allowed to pass to the phase detector, and the second phase of the clock is the time in which a feedback pulse is passed to the pulse detector. The method comprises remembering when a reference signal pulse has occurred by using the reference signal pulse to change the logic state of the output of a first reference filp-flop; remembering when a feedback signal pulse state of the output of the first feedback filp-flop; interrogating the first feedback filp-flop by a second feedback flip-flop, which has the output of the first feedback flip-flop as a first input to the second feedback flip-flop by a first phase signal from a two phase clock circuit at a second input of the second feedback flip-flop, the first phase signal simultaneously activating a reference gate to transmit a reference output pulse; interrogating the first reference flip-flop by a second reference flip-flop, which has the output of the first reference flip-flop as a first input to the second reference flip-flop, by a second phase signal from the two phase clock circuit at a second input of the second reference flip-flop, the first phase signal simultaneously activating a feedback gate to transmit a feedback output pulse; resetting the first reference flip-flop with the reference output pulse; and resetting the first feedback flip-flop with the feedback output pulse. The second reference flip-flop then interrogates the first reference flip-flop on the next arriving second phase signal and hence the second reference flip-flop becomes reset, completing the cycle until the time of the next incoming reference pulse. A similar operation completes the cycle for the feedback pulse.

The second embodiment, disclosed herein, operates by providing a guard band around the reference signal pulse to insure that the feedback signal pulse cannot occur within this band. To accomplish this, digital one shots of different pulse duration are utilized to prevent the feedback output pulse from being supplied to the phase detector simultaneously with a reference output pulse. The method of accomplishing this comprises the delaying of reference signal pulses; forming a guard band around the reference signal pluse, of a duration greater than the delay of the reference signal pulse, which prevents feedback output pulses from occurring within said guard band; generating a reference output pulse at the end of the delay and within the guard band; delaying the feedback signal pulse for a time less than the delay time for the reference signal pulse; and generating a feedback output pulse outside the guard band.

The primary object of this invention is to prevent coincidence of reference and feedback pulses at the input of the phase detector and thereby to prevent inaccuracy in the servo system operation.

Further objects of the invention will be apparent to those skilled in the art in light of the following detailed description:

DESCRIPTION OF PREFERRED EMBODIMENTS

Figure 1:
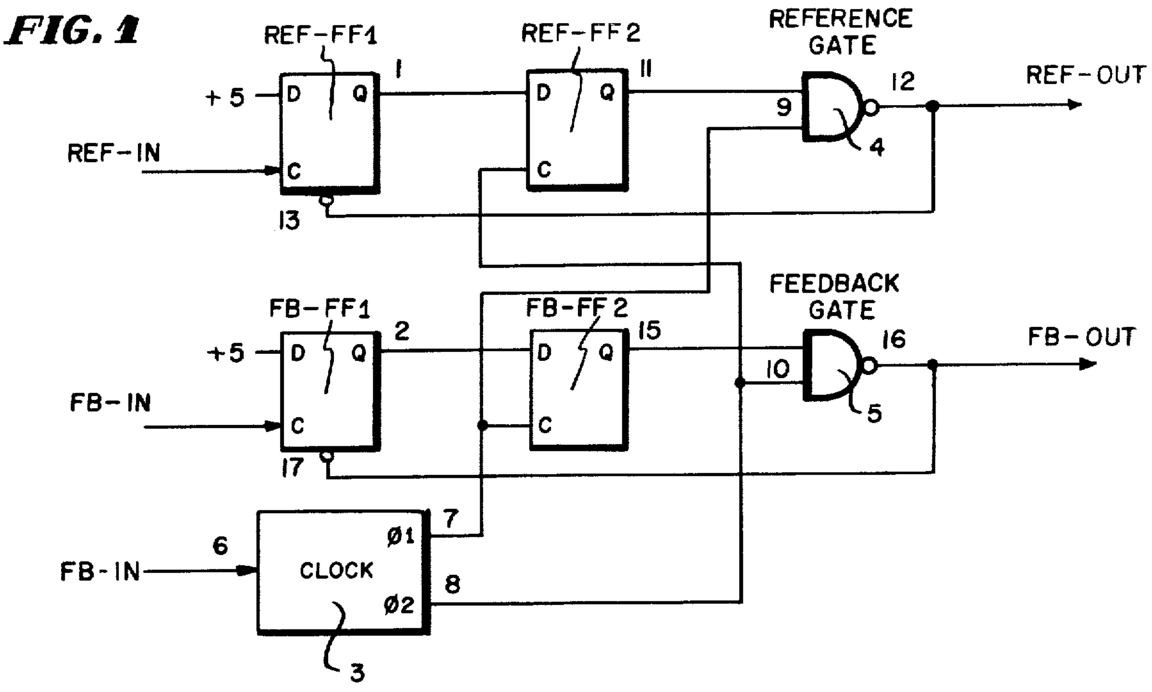
FIG. 1 is a schematic diagram of the first embodiment of this method utilizing flip-flops triggered by a two phase clock.

FIG. 1 shows the first embodiment of the anti-coincidence method and circuit where time zones in which each of the reference and feedback pulses can occur, are assigned. Reference flip-flop REF-FF1 and feedback flip-flop FB-FF1 have a constant DC input logical TRUE level at their respective inputs D. Therefore, when a REF-IN pulse occurs at the C input of REF-FF1 or at the C input of FB-FF1, the Q outputs will go to TRUE level. These flip-flops serve as reference and feedback memory circuits. If a reference input pulse occurs at input C of reference flip-flop REF-FF1, the output 1 will go to a unity logic state. Likewise, a feedback input pulse FB-IN at input C of feedback flip-flop FB-FF1 will set that flip-flop output 2 to a unity logic state. The two phase clock 3 in conjunction with reference flip-flop REF-FF2 and feedback flip-flop FB-FF2 serve as a means of interrogating the reference and feedback memory circuits to detect the occurrence of a reference or feedback signal pulse. The two phase clock outputs 7 and 8 also transmit reference and feedback output pulses by activating the reference and feedback gates 4 and 5, respectively. The input 6 of the clock is supplied with a 3.58 MHz signal from a stable source, such as a crystal controlled oscillator. The clock separates this 3.58 MHz input into two clocking outputs $\phi 1$ at 7 and $\phi 2$ at 8 of 3.58 MHz, each being 70 ns wide and separated from each other by 140 ns. As shown in FIG. 1, first phase clock signal $\phi$ interrogates feedback flip-flop FB-FF2 at its input C, and simultaneously activates the reference gate 4 by applying a pulse to input 9. Second phase clock output $\phi 2$ at 8 interrogates reference flip-flop REF-FF2 at its input C and activates the feedback gate 5 by applying a pulse to input 10.

If a reference signal input is received, for example, the output 1 of reference flip-flop REF-FF1 will go to a unity logic state. The next $\phi 2$ clocking pulse will clock reference flip-flop REF-FF2 at its input C causing the output 11 to go to a unity logic state. When the next $\phi 1$ clocking pulse occurs at reference gate input 9, an output pulse REF-OUT at the reference output 12 will occur. This reference output is supplied to a phase detector which incorporates an up-down counter (not shown), and it also resets reference flip-flop REF-FF1 at reset input 13. Since the D input to REF-FF2 is now at ZERO logic state, this flip-flop will also reset on the next $\phi 2$ pulse.

Likewise, if a feedback signal pulse FB-IN occurs at the input C of feedback flip-flop FB-FF1, its output 2 goes to a unity logic. The next $\phi 1$ clock pulse interrogates feedback flip-flop FB-FF2 at its input C to determine if a unity logic state exists at the output 1 of feedback flip-flop FB-FF1. If there is a unity logic state at output 2, the output 15 of feedback flip-flop FB-FF2 goes to a unity logic state. The next $\phi 2$ clock pulse at feedback gate input 10 causes a feedback output pulse FB-OUT to occur at 16. Again, as occurs with the reference output, the feedback output pulse resets feedback flip-flop FB-FF1 by a signal occurring at reset input 17. Flip-flop FB-FF2 will then reset at the next $\phi 1$ pulse.

Figure 2:
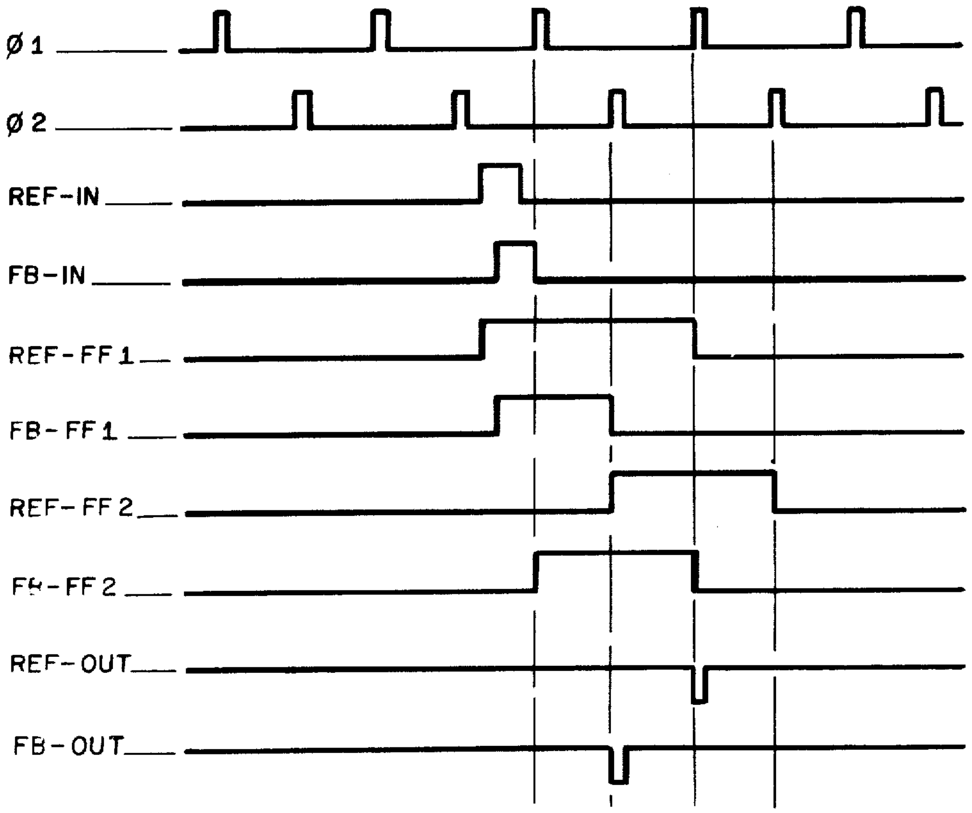
FIG. 2 shows the reference and feedback pulses along wtith the clock pulses and schematically illustrates the operation of the first embodiment.

This arrangement insures that a reference output pulse can only occur when a $\phi 1$ clock pulse occurs and that a feedback output pulse can only occur when a $\phi 2$ clock pulse occurs. Therefore, this system insures that a reference and feedback pulse cannot coincide at the input of the phase detector. The phase relationship and timing of these various signals is shown in FIG. 2.

Figure 3:
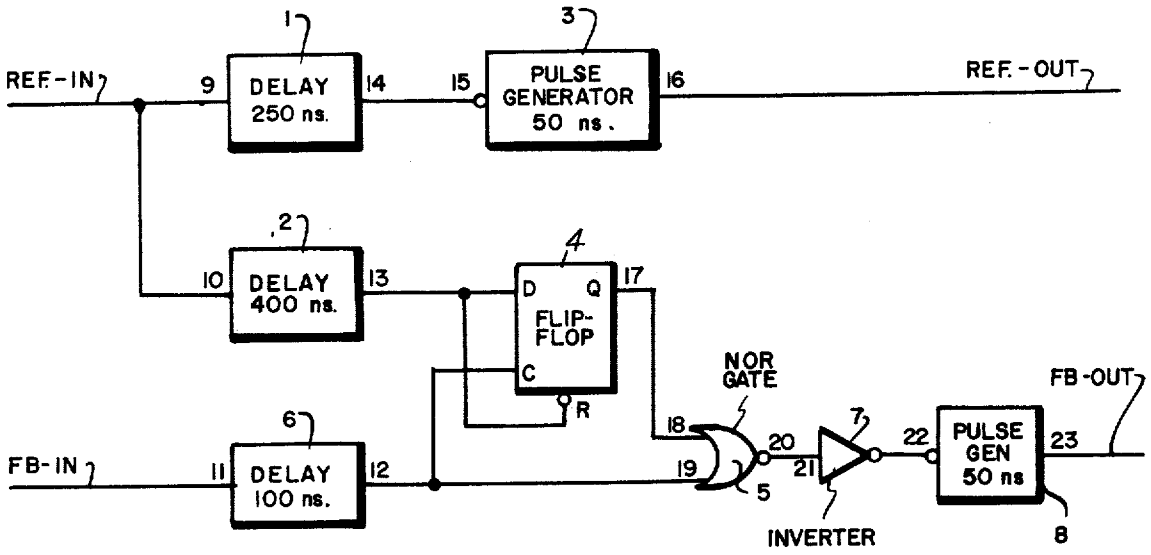
FIG. 3 is a schematic diagram of the second embodiment which incorporates digital one shots to supply a guard band around the reference pulse.
Figure 4:
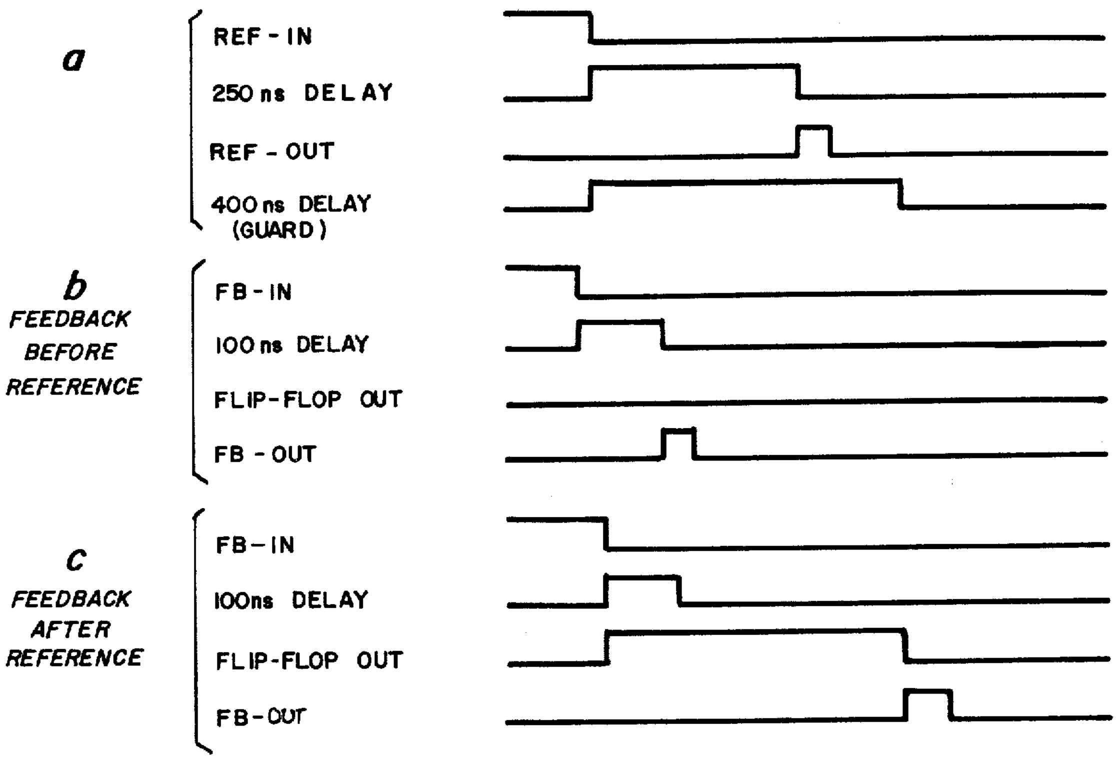
FIG. 4 shows the signal levels during operation of the circuit, including two cases: first, when the feedback signal occurs just prior to the reference signal; and second, when the feedback signal occurs just after the reference signal.

A second means for assigning separate time zones in which reference and feedback output pulses can occur is shown in FIG. 3 with phase diagrams shown in FIG. 4.

This embodiment provides a 400 ns guard band around the reference signal to insure that the feedback output pulse cannot occur within this 400 ns band. This is accomplished by utilizing one shots of various output durations to activate a flip-flop and a gate. The one shots or delays 1, 2 and 6 on the input side of this embodiment are activated or triggered by the trailing edge of the pulse, but it would be possible to activate them by the leading edge as well. Other means of delay, such as conventional delay lines, will be obvious to those skilled in the art. One shots or pulse generators 3 and 8 on the output side of the circuit, FIG. 3, are activated by a negative-going edge, as indicated by the circle at their respective inputs 15 and 22.

The flip-flop, 4, is a "D" flip-flop. This device is activated only on the positive edge of the clock ("C") input, at which time the output will assume the same level as the "D" input. Hence, even though the "D" input goes high while the "C" input is high, the output will not change. Gate 5 is a NOR gate; that is, the output 20 of this gate will be high (or "ONE") only in case both of the inputs 18 and 19 of this gate are low (or "ZERO"). Only under this condition, therefore, will the output of inverter 7—the input 21 of which is connected to gate output 20 and the output of which is connected to input 22 of 50 ns delay 8—be low. Under all other conditions output 20 of the NOR gate will be low and, hence, input 22 to delay 8 high.

A reference signal input pulse REF-IN is applied to the reference delay one shot 1 at its input 9. This causes the reference delay one shot 1 to generate a pulse of 250 ns duration. the output 14 of reference delay one shot 1 is connected to the input 15 of reference output one shot 3. The trailing edge of the 250 ns pulse from reference delay one shot 1 triggers reference output one shot 3 which generates a reference output signal REF-OUT at 16 of 50 ns duration.

The reference signal input pulse applied to reference delay one shot 1 is also applied to guard one shot 2 at its input 10. The purpose of guard one shot 2 is to insure that a reference output pulse and feedback output pulse do not coincide. This is accomplished by forcing the feedback output pulse to occur after the 400 ns delay if a reference and feedback input pulse occur at such a time as to cause coincidence. When a reference signal pulse REF-IN occurs at input 10 of guard one shot 2, a 400 ns guard band pulse is generated at output 13. This 400 ns pulse is applied to input D of flip-flop 4 and it also removes the signal from the reset input R of flip-flop 4, due to the inversion at the last mentioned input. Feedback signal input pulses FB-IN are applied to input 11 of feedback delay one shot 6. Feedback delay one shot 6 generates a 100 ns output pulse at 12 which is applied to both NOR gate 5 feedback signal input 19 and flip-flop 4 input C. If a feedback signal input pulse occurs during the time that the 400 ns pulse is applied to input D of flip-flop 4 (see FIG. 4*c*), an output occurs at flip-flop 4 output 17. Therefore, a signal will appear at both control input 18 and feedback signal input 19 of NOR gate 5, preventing any output at 20. The trailing edge of the 400 ns pulse from one shot 2 resets flip-flop 4, causing output 17 to go to a ZERO logic state. When this occurs NOR gate 5 produces a signal at 20 which is applied to inverter 7 and input 21. Inverter 7 inverts the signal and applies a signal to feedback output one shot 8 at its input 22. One shot 8 produces a 50 ns feedback output pulse FB-OUT at 22.

When a feedback signal input pulse occurs at 11 before a reference signal input pulse occurs at 9, (see FIG. 4*b*) one shot 6 generates a 100 ns output pulse at 12. At this time the D input to FF4 will be low since the 400 ns guard band 2 has not been activated; hence the FF4 output will also remain low. Since there is no high (TRUE) signal from flip-flop 4 output 17, NOR gate 5 produces an output at 20 as soon as the output of 1 shot 6 returns to its low state— which causes a 50 ns feedback output pulse FB-OUT, generated at the end of the 100 ns delay.

It will thus be seen that in the case of FIG. 4*b* the feedback output pulse is caused to occur prior to the reference output pulse while in the instance of FIG. 4*c* the feedback output pulse will always appear subsequent to the reference output pulse. In this manner overlapping of the two output pulses is avoided under all conditions.

It will be understood that, if the feedback pulse arrives very late, that is, subsequent to the termination of the guard interval, the operation is substantially the same as described in conjunction with FIG. 4*b* except that in this instance the events depicted in FIG. 4*b* occur much later in time, for example, near the right-hand end of the chart.

A guard band other than 400 ns could be utilized in the above described embodiment; however, criteria such as the aging characteristics, temperature characteristics, and manufacturing tolerances of the components used must be considered in selecting guard bands of different duration.

We claim:

1. A method of preventing coincidence of reference signal pulses and feedback signal pulses in a servo system comprising: supplying the reference signal pulses and the feedback signal pulses to separate input points of an anti-coincidence circuit having separate output points for reference and feedback output pulses; and assigning, by said anti-coincidence circuit separate time zones in which reference and feedback output pulses can occur;

wherein the assigning of separate time zones includes:

a. remembering when a reference signal pulse has occurred by a reference memory circuit;

b. remembering when a feedback signal pulse has occurred by a feedback memory circuit;

c. interrogating, to detect the occurrence of a reference signal pulse, the reference memory circuit while transmitting a feedback output pulse from the feedback memory circuit; and d. interrogating, to detect the occurrence of a feedback signal pulse, the feedback memory circuit while transmitting a reference output pulse from the reference memory circuit.

2. A method of preventing coincidence of reference signal pulses and feedback signal pulses in a servo system comprising: supplying the reference signal pulses and the feedback signal pulses to separate input points of an anti-coincidence circuit having separate output points for reference and feedback output pulses; and assigning, by said anti-coincidence circuit separate time zones in which reference and feedback output pulses can occur;

wherein the assigning of separate time zones includes:

a. remembering when a reference signal pulse has occurred by using the reference signal pulse to change the logic state of the output of a first reference flip-flop;

b. remembering when a feedback signal pulse has occurred by using the feedback signal pulse to change the logic state of the output of a first feedback flip-flop;

c. interrogating the first feedback flip-flop by a second feedback flip-flop which has the output of the first feedback flip-flop as a first input to the second feedback flip-flop, bby applying a first phase signal from a two phase clock circuit to a second input of the second feedback flip-flop, the first phase signal simultaneously activating a reference gate to transmit a reference output pulse;

d. interrogating the first reference flip-flop by a second reference flip-flop which has the output of the first reference flip-flop as a first input to the second reference flip-flop, by applying a second phase signal from the two phase clock circuit to a second input of the second reference flip-flop, the first phase signal simultaneously activating a feedback gate to transmit a feedback output pulse;

e. resetting the first reference flip-flop with the reference output pulse; and f. resetting the first feedback flip-flop with the feedback output pulse.

3. A method of preventing coincidence of reference signal pulses and feedback signal pulses in a servo system comprising: supplying the reference signal pulses and the feedback signal pulses to separate input points of an anti-coincidence circuit having separate output points for reference and feedback output pulses; and assigning, by said anti-coincidence circuit separate time zones in which reference and feedback output pulses can occur;

wherein the assigning of separate time zones includes:

a. delaying a received reference signal pulse;

b. forming a guard band around the reference signal pulse of a duration greater than the delay of the reference signal pulse;

c. delaying a received feedback signal pulse for a time less than the delay time for the reference signal pulse; and d. if said feedback signal pulse is received outside of said guard band, permitting the feedback output pulse to be transmitted at the end of the feedback signal pulse delay, and, if said feedback signal pulse is received within said guard band, causing the feedback output pulse to be transmitted in response to the termination of said guard band and independently of the time of receipt of the feedback signal pulse within said guard band.

4. A circuit for preventing coincidence of reference signal pulses and feedback signal pulses in a servo system, comprising: an anti-coincidence circuit having separate input points for reference signal pulses and feedback signal pulses and having separate output points for reference and feedback output pulses, and means for assigning, within said anti-coincidence circuit, separate time zones in which reference and feedback output pulses can occur;

wherein the means for assigning separate time zones include:

a. a reference memory circuit for remembering when a reference signal pulse has occurred;

b. a feedback memory circuit for remembering when a feedback signal pulse has occurred;

c. means for interrogating the reference memory circuit to detect the occurrence of a reference signal pulse while transmitting a feedback output pulse from the feedback memory circuit; and d. means for interrogating the feedback memory circuit to detect the occurrence of a feedback signal pulse while transmitting a reference output pulse from the reference memory circuit.

5. A circuit for preventing coincidence of reference signal pulses and feedback signal pulses in a servo system, comprising: an anti-coincidence circuit having separate input points for reference signal pulses and feedback signal pulses and having separate output points for reference and feedback output pulses, and means for assigning, within said anti-coincidence circuit, separate time zones in which reference and feedback output pulses can occur;

wherein the means for assigning separate time zones include:

a. a first reference flip-flop for remembering when a reference signal pulse has occurred, the reference signal pulse causing a change in the logic state of the output of the first reference flip-flop;

b. a first feedback flip-flop for remembering when a feedback signal pulse has occurred, the feedback signal pulse causing a change in the logic state of the output of the first feedback flip-flop;

c. a second feedback flip-flop having first and second inputs and used to interrogate the first feedback flip-flop, the output of the first feedback flip-flop being connected to the first input to the second feedback flip-flop;

d. a reference gate to transmit a reference output pulse;

e. a first phase clock signal being connected to the second input to the second feedback flip-flop and to the reference gate whereby the first feedback flip-flop is interrogated and the reference gate is activated to transmit a reference output pulse;

f. a second reference flip-flop having first and second inputs and used to interrogate the first reference flip-flop, the output of the first reference flip-flop being connected to the first input of the second reference flip-flop;

g. a feedback gate to transmit a feedback output pulse; and h. a second phase clock signal being connected to the second input to the second reference flip-flop and to the feedback gate whereby the first reference flip-flop is interrogated and the feedback gate is activated to transmit a feedback output pulse.

6. A circuit for preventing coincidence of reference signal pulses and feedback signal pulses in a servo system, comprising: an anti-coincidence circuit having separate input points for reference signal pulses and feedback signal pulses and having separate output points for reference and feedback output pulses; and means for assigning, within said anti-coincidence circuit, separate time zones in which reference and feedback output pulses can occur;

wherein the means for assigning separate time zones include:

a. first delay means interposed between said reference pulse input and output points, for delaying a received reference signal pulse;

b. second delay means interposed between said feedback pulse input and output points, for forming in relation to the reference signal pulse, a guard band of a duration greater than the delay of the reference signal pulse;

c. third delay means for delaying a received feedback signal pulse for a time less than the delay time for the reference signal pulse; and d. switching means jointly controlled by said second and third delay means, and effective if said feedback signal pulse is received outside of said guard band to permit the feedback output pulse to be transmitted over said feedback pulse output point at the end of the feedback signal pulse delay, and effective if said feedback signal pulse is received within said guard band to cause the feedback output pulse to be transmitted over said feedback pulse output point, only in response to the termination of said guard band, independently of the receipt of the feedback signal pulse within said guard band.

7. A circuit for preventing coincidence of reference signal pulses and feedback signal pulses in a servo system, comprising: an anti-coincidence circuit having separate input points for reference signal pulses and feedback signal pulses and having separate output points for reference and feedback output pulses, and means for assigning, within said anti-coincidence circuit, separate time zones in which reference and feedback output pulses can occur;

wherein the means for assigning separate time zones include:

a. first delay means for delaying a received reference signal pulse;

b. second delay means for forming, in relation to the reference signal pulse, a guard band of a duration greater than the delay of the reference signal pulse;

c. third delay means for delaying a received feedback signal pulse for a time less than the delay time for the reference signal pulse;

d. first generating means for generating a reference output pulse at the end of the reference signal pulse delay and within the guard band;

e. second generating means for generating a feedback output pulse; and f. switching means jointly controlled by said second and third delay means, and effective if said feedback signal pulse is received outside of said guard band to permit said second generating means to be actuated at the end of the feedback signal pulse delay, and effective if said feedback signal pulse is received within said guard band to cause said second generating means to be actuated only in response to the termination of said guard band, independently of the receipt of the feedback signal pulse within said guard band.

8. A circuit for preventing coincidence of reference signal pulses and feedback signal pulses in a servo system, comprising: an anti-coincidence circuit having separate input points for reference signal pulses and feedback signal pulses and having separate output points for reference and feedback output pulses, and means for assigning, within said anti-coincidence circuit, separate time zones in which reference and feedback output pulses can occur;

wherein the means for assigning separate time zones include:

a. a reference delay one shot having an input and output for delaying a reference signal pulse;

b. a guard one shot having an input and output for forming a guard band around the reference signal pulse of a duration greater than the delay of the reference delay;

c. a flip-flop, having a first and second input and an output, the first input connected to the output of the guard one shot;

d. a NOR gate having a control input, a feedback signal input, and an output, said control input being connected to the output of the flip-flop;

e. a reference output one shot connected to the output of the reference delay one shot for generating a reference output pulse at the end of the reference delay and within the guard band;

f. a feedback delay one shot having an input and output for delaying the feedback signal pulse for a time less than the delay time for the reference signal pulse, the output of said feedback delay one shot being connected to both the second input of the flip-flop and the feedback signal input of the feedback gate; and g. a feedback output one shot having an input and an output, the input being connected to the output of the feedback gate.

* * * * *